No. 641,370. Patented Jan. 16, 1900.
J. CARRUTHERS & E. J. FITHIAN.
CLUTCH.
(Application filed May 4, 1899.)
(No Model.) 3 Sheets—Sheet 1.
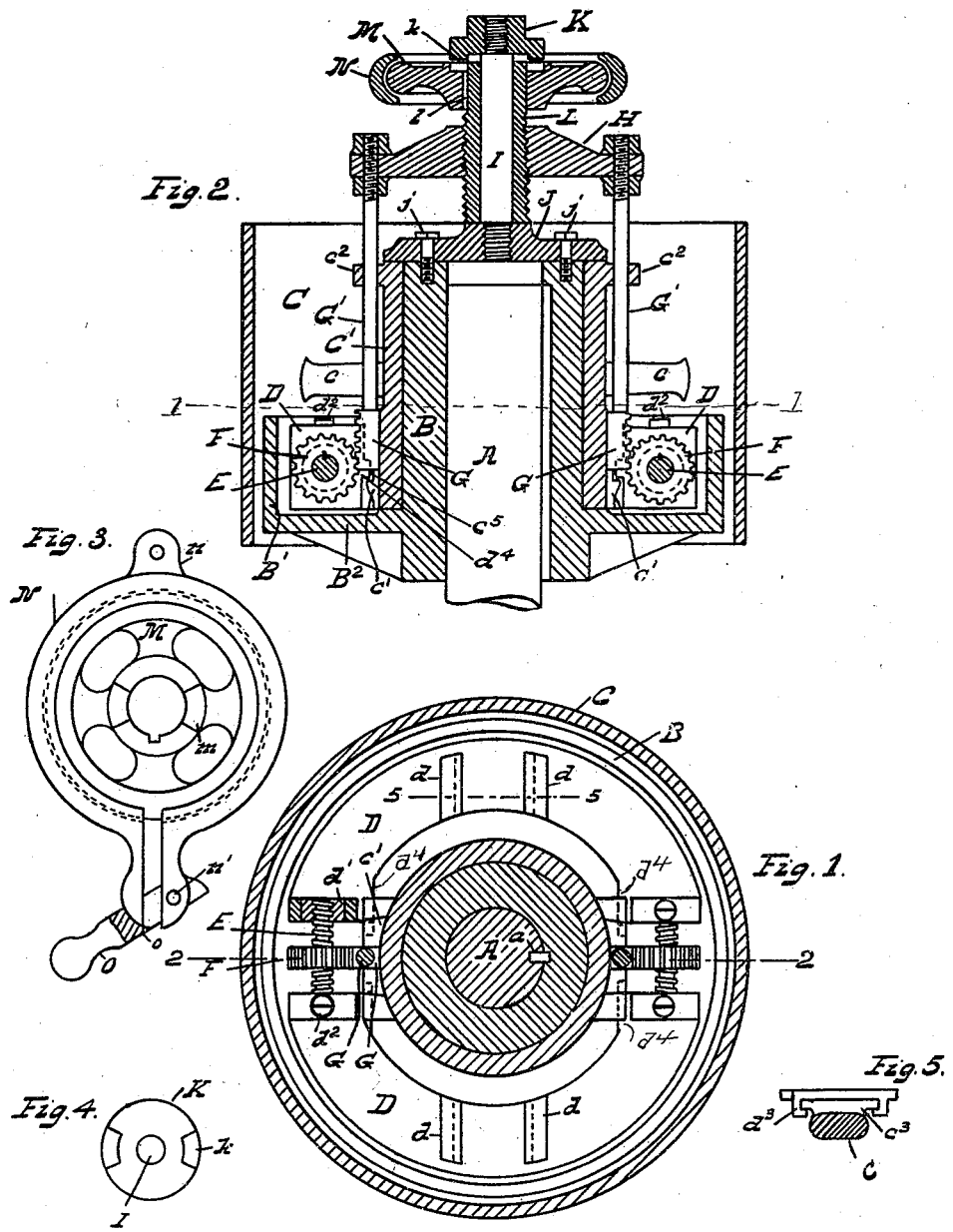
Witnesses:
John Walton
F. L. Ourand
Inventors:
John Carruthers
and
Edwin J. Fithian
By
Attorney No. 641,370. Patented Jan. 16, 1900.
J. CARRUTHERS & E. J. FITHIAN.
CLUTCH.
(Application filed May 4, 1899.)
(No Model.) 3 Sheets—Sheet 2.

Witnesses:
John Walton
J. L. Ourand

Inventors
John Carruthers
Edwin J. Fithian
By N. L. Lord
Attorney.

No. 641,370. Patented Jan. 16, 1900.
J. CARRUTHERS & E. J. FITHIAN.
CLUTCH.
(Application filed May 4, 1899.)

(No Model.) 3 Sheets—Sheet 3.

Witnesses:
John Walton
J. L. Ourand

Inventors.
John Carruthers
Edwin J. Fithian
By V. Z. Lord
Attorney

UNITED STATES PATENT OFFICE.

JOHN CARRUTHERS AND EDWIN J. FITHIAN, OF GROVE CITY, PENNSYLVANIA.

CLUTCH.

SPECIFICATION forming part of Letters Patent No. 641,370, dated January 16, 1900.

Application filed May 4, 1899. Serial No. 715,630. (No model.)

*To all whom it may concern:*

Be it known that we, JOHN CARRUTHERS and EDWIN J. FITHIAN, citizens of the United States, residing at Grove City, in the county of Mercer and State of Pennsylvania, have invented certain new and useful Improvements in Clutches; and we do hereby declare the following to be a full, clear, and exact description of the invention, such as will enable others skilled in the art to which it appertains to make and use the same.

This invention relates to clutches; and it consists in certain improvements in the construction thereof, as will be hereinafter fully described, and pointed out in the claims.

The object of the invention is to produce a simple, strong, and compact clutch which may be operated with very little exertion, and to this end the driving member of the clutch is utilized as a motor for moving the clutch mechanism into locking position.

Figure 7:
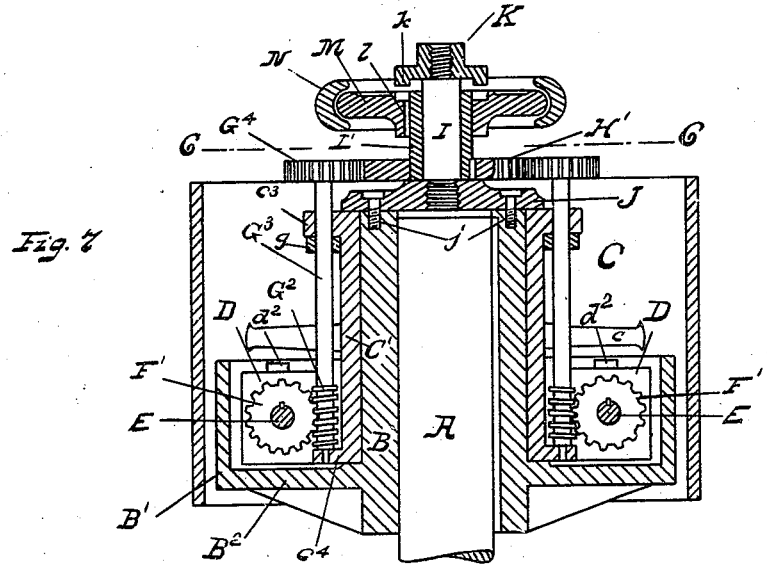
Figure 6:
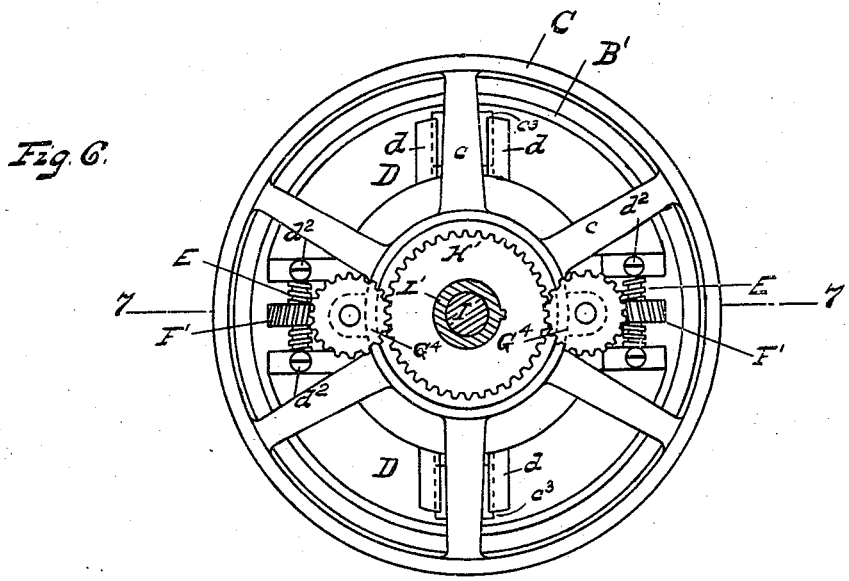
Figure 9:
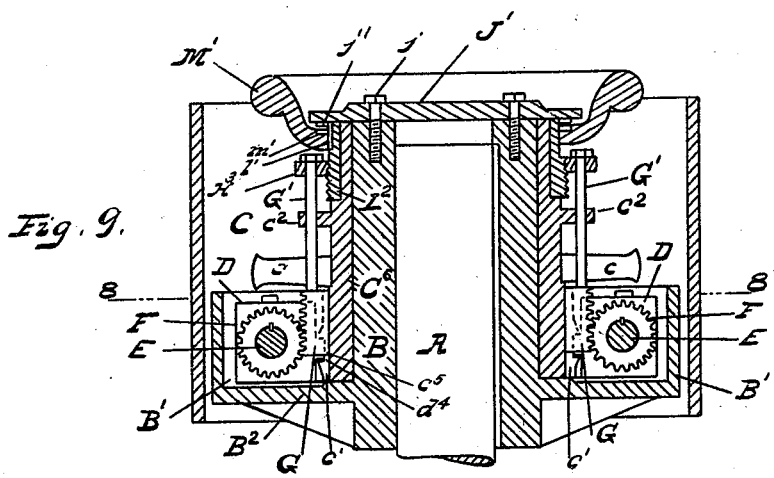
Figure 8:
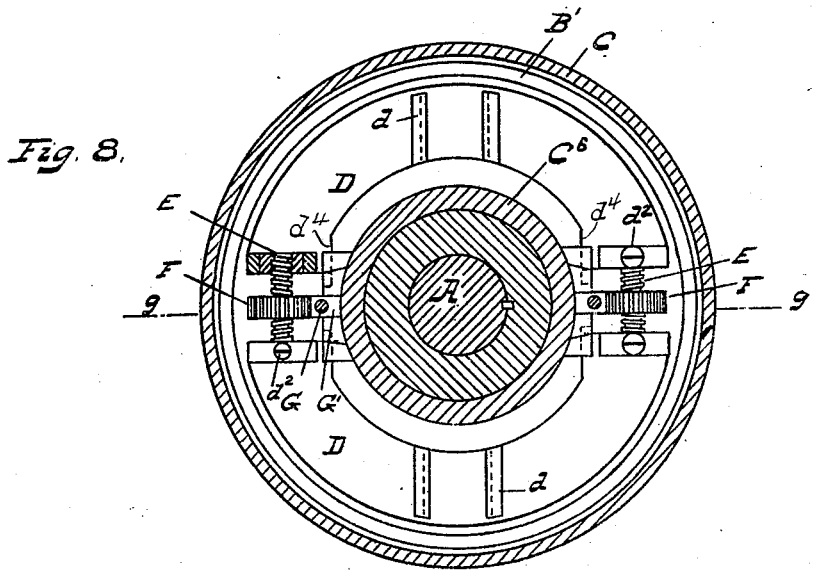

The mechanism is preferably applied to friction-clutches, and in the accompanying drawings the invention is illustrated as applied to a friction-clutch as follows:

Figure 1 shows a section on the line 1 1 in Fig. 2. Fig. 2 shows a section on the line 2 2 in Fig. 1. Fig. 3 shows an end elevation of the operating-wheel of the auxiliary clutch. Fig. 4 shows an end view of a detail of the auxiliary clutch. Fig. 5 shows a section of a fragment of the device on the line 5 5 in Fig. 1. Figs. 6 and 7 show an alternative construction, Fig. 6 being a section on the line 6 6 in Fig. 7, and Fig. 7 being a section on the line 7 7 in Fig. 6. Figs. 8 and 9 also show an alternative construction, Fig. 8 being a section on the line 8 8 in Fig. 9 and Fig. 9 being a section on the line 9 9 in Fig. 8.

A marks the shaft, which in the construction shown carries the driving member of the clutch B, which is locked against rotative movement on the shaft by the key $a$. This driving member comprises the hub or sleeve B, the web $B^2$, which extends outwardly from it, and the inturned flange $B'$, the inner side of which forms the friction-surface of the driving member.

The pulley C, which may be termed the "driven member" of the clutch, comprises the spokes $c$, extending from the hub $C'$, which is journaled on the hub B of the driving member.

The friction-shoes D D are provided with the guides $d$, in which is a groove $d^3$, which is arranged to slide on guides $c^3$, preferably arranged to the spoke $c$ of the pulley C. At the ends of the shoes are arranged the nuts $d'$, which are preferably removable and secured in place by the set-screws $d^2$. Lugs $d^4$ extend inwardly from the nuts $d'$ into grooves $c^5$ in lugs $c'$, extending from the hub, and serve to guide the ends of the shoes. Reversely-threaded screws E are arranged to operate in these nuts $d'$ and have mounted upon them the gears F. Racks G are arranged to slide in the guides $c'$ and to mesh with the gears F. The rods $G'$ extend from the racks G and are secured in a cross-head H. The rods $G'$ pass through the perforated ears $c^2$, extending from the hub $C'$, and these serve as guides for the rods.

An extension from the driving member is provided in the form of a stud I. This is secured to a plate J, which is secured to the hub B by the bolts $j$. The plate J extends beyond the hub B, so as to form a shoulder for holding the hub $C'$ of the pulley in place on the hub B. At the outer end of the extension I is a clutch-plate K, having the detents $k$, which are arranged to lock with similar detents $m$ on a starting-wheel M. Journaled on the extension I is a screw-threaded sleeve L, on which the cross-head H is designed to operate. The starting-wheel M is arranged on the sleeve L, with a spline $l$ and groove mechanism, and, as before stated, has the detents $m$, which are arranged to engage the detents $k$ of the plate K.

The operation of the device is as follows: Assuming the driven member to be at rest and the driving member to be in motion, the extension I, with the plate K, will then be moving with the driving member and the sleeve L will remain stationary with the driven member. The starting-wheel is grasped and drawn outwardly, so as to bring the detents $m$ into engagement with the detents $k$. This mechanism forms an auxiliary clutch, which sets the mechanism to move the main clutch into locking position. As soon as the auxiliary clutch is engaged the sleeve L is rotated by reason of the rotation of the wheel M, and the screw on said sleeve operating in the crosshead H moves said cross-head in or out, (as shown, inwardly,) and this carries with it the rods G' and racks G, which turn the gears F, and consequently the screws E. The screws E and the screw on the sleeve L are so pitched relatively to each other that the movement of the cross-head incident to the forward movement of the sleeve L in the cross-head H will so move the racks and turn the gears F as to turn the screws E in a proper direction to spread the shoes D. As the driving member continues to turn the cross-head is carried along by reason of the action of the screw on the sleeve L until it has moved, through the instrumentality of the racks, gears, and screws E, the shoes D into contact with the friction-surface on the inside of the flange B'. The driven member then is started; but so long as there is any relative movement between the driving member and driven member, or, in other words, until the driven member moves with the driving member, the screwsleeve L continues to operate in the crosshead H and to force the shoes D into closer engagement with the friction-surface of the flange B'. The strength of the clutch therefore can only be measured by the strength of the parts—that is, the shoes D will be subjected to pressure increasing as long as there is relative movement between the driving and driven members; but, on the other hand, if the load on the driven member is slight, so that it will take up the full movement of the driving member with a slight pressure, this pressure will be all that the parts will be subjected to. Expressing this another way, the pressure is automatically adjusted to load. The hand-wheel M will of course be revolving with the driving member when the clutch is in engagement and the parts are in motion. If it is desired to release the clutch, the hand-wheel M is pushed inwardly, so as to release the auxiliary clutch. This can readily be done with the hand, if desired, by pressing on the smooth surface of the outer periphery. After the clutch is released the hand-wheel M may be made to move slower than the driving member by exerting brakepressure on its periphery. This turns the sleeve L backwardly relatively to the members, and thus moves the cross-head in a direction to turn the gears F and screws E so as to move the shoes D out of engagement with the surface of the flange B'. The driven member then comes to a stop, together with the sleeve L and hand-wheel M.

Clutches have been made which brought the driving member and driven member into engagement through the agency of some fluid which was actuated by a mechanism operated by a relative movement of the driving and driven member; but these are of expensive construction, and the fluid under such high pressures as it is necessary to use in clutches of compact construction is difficult to control. In all these structures as far as we are aware the friction-surfaces are brought together by axial movement. It will be noted that in the construction shown the friction-surfaces are brought together by a movement in a radial direction. This permits of the largest friction-surface possible in a small space, and at the same time the different forces operating in the clutch may be readily neutralized within the clutch itself. It also permits of the construction of a powerful clutch which is carried entirely by the driving or driven member—that is, it requires no floor-stand or other device on which may be formed a fulcrum for operating the clutch mechanism.

A brake mechanism consisting of the split ring N, supported by a hanger $n$, may be arranged around the hand-wheel M. At the parting of the ring a lever O, pivoted at $n'$, operates by means of a cam-surface $o$ upon the ring N to close said ring when the lever O is operated to bring the cam $o$ into action. There is sufficient spring in the ring to open it sufficiently to carry it out of engagement with the wheel M when the lever O is thrown to release the ring. The ring is preferably formed with an annular groove on its inner surface of such size and shape as to receive the periphery of the wheel M. The auxiliary clutch may be thrown into and out of engagement by the action of the ring N upon the wheel M, and the wheel M can be subjected to the braking action necessary to release the main clutch by the operation of the ring N when closed by the lever O.

In Figs. 6 and 7 the driving and driven members are of the same general construction as in Figs. 1 and 2, and are so lettered. The screws E are provided with worm-gears F', on which are arranged to operate worms $G^2$. The rods $G^3$ extend from the worms $G^2$, and these are journaled in the ears $c^3$ and $c^4$, extending from the hub C'. The rods are reduced in size where they enter the ears $c^4$, so as to form a shoulder against the bearings formed in said ears, and collars $g$ are arranged in such relation to the ears $c^3$ as to prevent axial movement of the rods $G^3$. Gears $G^4$ are secured on the rods $G^3$ and mesh with a gear H'. The hub L' of the gear H' is journaled on the extension I, which is secured to the driving member in a manner similar to that shown in Fig. 1. The extension I has the plate K and hand-wheel M arranged on the hub L' in substantially the same manner as these parts are arranged in Fig. 1. In this construction when it is desired to throw the clutch into engagement the auxiliary clutch is set. This rotates the gear H', and consequently the gears $G^4$, rods $G^3$, worms $G^2$, worm-gears F', and screws E, so as to move the shoes D outwardly into engagement with the flange B'. To release the clutch, the auxiliary clutch is thrown out of engagement and the wheel M subjected to the braking action of the hands or the brake-ring N. This turns the gear H' backwardly relatively to the movement of the members and so actuates the worms G², worm-gears F', and screws E as to move the shoes inwardly out of engagement.

In the construction shown in Figs. 8 and 9 the element of the mechanism which performs the same functions as the screw-sleeve L is constructed in the form of a sleeve L², which is journaled directly upon the hub C⁶ of the driven member. A plate J', secured by the bolts j on the driven member, extends beyond the hub C⁶ and the screw-sleeve L², holding them in place, and has on its outer periphery detents j', into which the detents m' of the hand-wheel M' may be brought into engagement. The hand-wheel is feathered on the sleeve L², so as to have some longitudinal movement upon it, as is the hand-wheel M on the sleeve L in Figs. 1 and 2. A nut H³ is arranged to be operated by the screw on the screw-sleeve L². The rods G' extend to the racks G and operate the gears F and screws E to actuate the shoes D, as in the construction shown in Figs. 1 and 2. The operation of this device will readily be understood from the described operation of the other devices.

It will be noted that the shoe D forms means for locking the members together and that the mechanism actuating said shoes—that is, any of the intermediate elements, screws E, gears F, racks G, cross-head H, or sleeve L—forms a non-fluid connecting mechanism having operative connections with both members of the clutch, which is arranged to be actuated by a relative movement of said members one to the other to move when so actuated the shoes or locking means into locking position. It will be noted also that the hand-wheel, through its spline-and-groove connection with the screw-sleeve L, forms a means, with the other mechanism, whereby the clutch may be thrown out of locking position. It will be noted also that this is done by a movement of the screw-sleeve in a reverse direction from that produced by the relative movement of the clutch members upon the screw-sleeve. It will also be noted that elements of this connecting mechanism have rotary motion, whereby the power-transmitting mechanism may have a long range of movement in a small space, thus effecting great pressure without undue strain on the parts. It will also be noted that in each of the constructions a screw is an element for moving the locking means or shoes into locking position. It will also be seen that by mounting the auxiliary clutch mechanism on the driven member the starting-wheel M is stationary until it is desired to throw the clutch into engagement, and then the main clutch may be thrown out of engagement by braking the starting-wheel.

We do not specifically claim in this specification the structure shown in Figs. 6 and 7 and 8 and 9, as these form the subject-matter of separate applications filed by us December 26, 1899, Serial Nos. 741,533 and 741,534.

What we claim as new is—

1. In a friction-clutch, the combination with the driving and driven members; of a friction device interposed between said members comprising friction-shoes arranged to be moved into and out of operative engagement by movement in a radial direction; a screw for moving said shoes into engagement; means actuated by the relative movement of the members one to the other for actuating said screw; and means for actuating said screw in a reverse direction while the clutch members are in motion.

2. In a clutch, the combination with the driving and driven members; of means for locking said members rotatively together; a male screw journaled with the axis of the clutch as an axis; an auxiliary clutch device for locking it with the driving member; and means actuated by the rotative action of its threads when said screw is locked with the driving member upon a relatively stationary part of the driven member for moving the means for locking said clutch members rotatively together into locking position.

3. In a clutch, the combination with the driving and driven members; of means for locking said members rotatively together; a male sleeve-screw journaled with the axis of the clutch as an axis; an auxiliary clutch device for locking it with the driving member; and means actuated by the rotative action of its threads when said screw is locked with the driving member upon a relatively stationary part of the driven member for moving the means for locking said clutch members rotatively together into locking position.

4. In a clutch, the combination with the driving and driven members; of means for locking said members rotatively together; a male sleeve-screw journaled with the axis of the clutch as an axis; an auxiliary clutch device for locking it with the driving member; a nut on said screw locked to rotate with the driven member; and a connection between said nut and the means for locking said clutch members rotatively together, whereby said members are moved into locking engagement with a relative movement of the clutch members one to the other.

5. In a clutch, the combination with the driving and driven members; means for locking said members together; mechanism for moving said locking means into and out of locking position; the rods, G', for actuating said mechanism; cross-head, H, to which said rods are secured; the extension, I, carried by the driving member; the sleeve-screw, L, journaled on said extension, I, and having its threads arranged to operate with threads in the cross-head, H; the clutch-plate, K, secured to the extension, I; the hand-wheel, M, feathered on the screw-sleeve, L, and having a means for being brought into and out of engagement with the clutch-plate, K.

6. In a friction-clutch, the combination with the driving and driven members; of a friction device interposed between said members comprising friction-shoes arranged to be moved into and out of operative engagement by movement in a radial direction; a screw journaled with the axis of the clutch as an axis for moving said shoes into engagement; and means actuated by relative movement of the members one to the other for actuating said screw.

7. In a friction-clutch, the combination with the driving and driven members; of a friction device interposed between said members comprising friction-shoes arranged to be moved into and out of operative engagement by movement in a radial direction; a screw journaled with the axis of the clutch as an axis, for moving said shoes into engagement; means actuated by relative movement of the members one to the other for actuating said screw; and means for actuating said screw in a reverse direction.

8. In a friction-clutch, the combination with the driving and driven members; of a friction device interposed between said members comprising friction-shoes arranged to be moved into and out of operative engagement by movement in a radial direction; a male screw journaled with the axis of the clutch as an axis, for moving said shoes into engagement; and means actuated by relative movement of the members one to the other for actuating said screw.

9. In a friction-clutch, the combination with the driving and driven members; of a friction device interposed between said members comprising friction-shoes arranged to be moved into and out of operative engagement by movement in a radial direction; a male screw journaled with the axis of the clutch as an axis, for moving said shoes into engagement; means actuated by relative movement of the members one to the other for actuating said screw; and means for actuating said screw in a reverse direction.

10. In a friction-clutch, the combination with the driving and driven members; of a friction device interposed between said members comprising friction-shoes arranged to be moved into operative engagement by movement in a radial direction; reversely-threaded screws interposed between said shoes; gears on said screws for turning said screws; and means actuated by the relative movement of the members one to the other for actuating said gears.

11. In a friction-clutch, the combination with the driving and driven members; of a friction device interposed between said members comprising friction-shoes arranged to be moved into operative engagement by movement in a radial direction; reversely-threaded screws interposed between said shoes; gears on said screws for turning said screws; means for actuating said gears; mechanism journaled with the axis of the clutch as an axis for actuating said means with a relative movement of the clutch members; and an auxiliary clutch for locking and disengaging said mechanism from and with the driving member.

12. In a friction-clutch, the combination with the driving and driven members; of a friction device interposed between said members comprising friction-shoes arranged to be moved into operative engagement by movement in a radial direction; reversely-threaded screws interposed between said shoes; gears on said screws for turning said screws; racks arranged in mesh with said gears; means for moving said racks in axial direction; and mechanism actuated by the relative movement of said members one to the other for actuating said means.

13. In a friction-clutch, the combination with the driving and driven members; of a friction device interposed between said members comprising friction-shoes arranged to be moved into operative engagement by movement in a radial direction; reversely-threaded screws interposed between said shoes; gears on said screws for turning said screws; racks arranged in mesh with said gears; a screw journaled with the axis of the clutch as an axis; means for locking it with the driving member; and means actuated by the rotative action of its thread for moving said racks for the purposes specified.

14. In a friction-clutch, the combination with the driving and driven members; of a friction device interposed between said members comprising friction-shoes arranged to be moved into operative engagement by movement in a radial direction; reversely-threaded screws interposed between said shoes; gears on said screws for turning said screws; racks arranged in mesh with said gears; a screw-and-nut mechanism journaled with the axis of the clutch as an axis; means for locking one of the elements of said screw-and-nut mechanism with the driving member and the other with the driven member; and a connection for transmitting the relative axial movement of the screw and nut to said racks.

15. In a friction-clutch, the combination with the driving and driven members; of a friction device interposed between said members comprising friction-shoes arranged to be moved into operative engagement by movement in a radial direction; reversely-threaded screws interposed between said shoes; gears on said screws for turning said screws; racks arranged in mesh with said gears; a screw journaled with the axis of the clutch as an axis; means for communicating the action of the screw to said racks; means for disengaging the screw from the driving member; and means for giving it movement in a reverse direction relatively to the driving member.

16. In a friction-clutch, the combination with the driving and driven members; of a friction device interposed between said members comprising friction-shoes arranged to be moved into operative engagement by movement in a radial direction; reversely-threaded screws interposed between said shoes; gears on said screws for turning said screws; racks arranged in mesh with said gears; a screw-and-nut mechanism journaled with the axis of the clutch as an axis; means for locking one element of the screw-and-nut mechanism with the driving member and the other with the driven member; a connection for transmitting the relative axial movement of the screw and nut to said racks; means for disengaging the screw or nut from the driving member; and means for giving the screw or nut so disengaged movement in a reverse direction relatively to the driving member.

17. In a friction-clutch, the combination with the axle, A; the driving member comprising the hub, B, spider, B², flange, B', secured to said axle; the driven member, C, having the hub, C', journaled on the hub, B; the friction-shoes, D, adapted to engage the flange, B'; the reverse-screws, E, between the ends of said friction-shoes; the gears, F, on said screws; the racks, G, arranged to engage said gears; the rods, G', extending from said racks; the cross-head, H, to which said rods are secured; the extension, I, secured to the driven member; the screw-sleeve, L, journaled on said extension, I; the auxiliary clutch-plate, K, on said extension; and the hand-wheel, M, feathered on the sleeve, L, and arranged to engage the clutch-plate, K.

In testimony whereof we affix our signatures in presence of two witnesses.

JOHN CARRUTHERS.
EDWIN J. FITHIAN.

Witnesses:
H. D. MURRAY,
J. C. WEAKLEY.